United States Patent
Sweeney

(10) Patent No.: US 10,497,223 B2
(45) Date of Patent: Dec. 3, 2019

(54) AUTOMATIC PRICE DISPLAY CONTROL BY EMULATION OF ELECTRONIC CASH REGISTER PRICE LOOKUP

(71) Applicant: Philip Morris USA Inc., Richmond, VA (US)

(72) Inventor: William R. Sweeney, Richmond, VA (US)

(73) Assignee: Philip Morris USA Inc., Richmond, VA (US)

( * ) Notice: Subject to any disclaimer, the term of this patent is extended or adjusted under 35 U.S.C. 154(b) by 201 days.

(21) Appl. No.: 15/495,382

(22) Filed: Apr. 24, 2017

(65) Prior Publication Data

US 2017/0228990 A1 Aug. 10, 2017

Related U.S. Application Data

(60) Continuation of application No. 14/729,637, filed on Jun. 3, 2015, now Pat. No. 9,652,757, which is a (Continued)

(51) Int. Cl.
*G06Q 30/00* (2012.01)
*G07G 1/14* (2006.01)
(Continued)

(52) U.S. Cl.
CPC ........... *G07G 1/145* (2013.01); *G06Q 20/201* (2013.01); *G06Q 20/202* (2013.01); *G06Q 30/06* (2013.01)

(58) Field of Classification Search
CPC ................ G06Q 30/00; G06Q 30/06
(Continued)

(56) References Cited

U.S. PATENT DOCUMENTS 4,002,886 A 1/1977 Sundelin
4,139,149 A 2/1979 Crepeau et al.
(Continued)

OTHER PUBLICATIONS

International Search Report and Written Opinion dated Apr. 20, 2004 for PCT/US03/16803.
(Continued)

*Primary Examiner* — Oluseye Iwarere
(74) *Attorney, Agent, or Firm* — Buchanan Ingersoll & Rooney PC

(57) ABSTRACT

A system and method for distribution of product price and/or sales data in a retail establishment. Product price and/or sales data is stored locally, either in a central computer or master electronic cash register (ECR) or remotely at a master computer. The product price data is stored in the form of a price look-up (PLU) table. The price data can be pushed from the master ECR, local or master computers to and ECR emulation hub to an ECR emulation hub. Similarly, the ECR emulation hub can request product price data from the master ECR, local or master computers. Once the product price data arrives at the ECR emulation hub, it can be processed and sent to a display, which will be located near the appropriate product. The ECR emulation hub can also record and/or transmit prices actually charged for products over time to allow for automatic auditing of promotional pricing offers such as those made by manufacturers of the product. The ECR emulation hub acts like au ECR, thereby requiring no special software or hardware modifications to existing pricing display systems that already support ECRs.

14 Claims, 14 Drawing Sheets

Related U.S. Application Data division of application No. 13/168,574, filed on Jun. 24, 2011, now Pat. No. 9,058,621, which is a continuation of application No. 12/230,237, filed on Aug. 26, 2008, now Pat. No. 7,997,487, which is a division of application No. 10/446,791, filed on May 29, 2003, now Pat. No. 7,433,831.

(60) Provisional application No. 60/384,833, filed on Jun. 4, 2002.

(51) Int. Cl.
    *G06Q 20/20*      (2012.01)
    *G06Q 30/06*      (2012.01)

(58) Field of Classification Search
    USPC .................................. 705/21, 20; 235/383
    See application file for complete search history.

(56) References Cited

U.S. PATENT DOCUMENTS

| | | | |
|---|---|---|---|
| 4,159,533 A | 6/1979 | Sakurai | |
| 4,500,880 A | 2/1985 | Gomersall et al. | |
| 4,843,546 A | 6/1989 | Yoshida et al. | |
| 4,870,577 A | 9/1989 | Karasawa et al. | |
| 5,162,639 A | 11/1992 | Sugiyama | |
| 5,198,644 A | 3/1993 | Pfeiffer et al. | |
| 5,239,167 A | 8/1993 | Kipp | |
| 5,310,997 A * | 5/1994 | Roach | A47F 9/046 235/375 |
| 5,401,947 A | 3/1995 | Poland | |
| 5,497,314 A | 3/1996 | Novak | |
| 5,504,475 A | 4/1996 | Houdou et al. | |
| 5,510,979 A * | 4/1996 | Moderi | G06Q 20/202 235/377 |
| 5,572,653 A | 11/1996 | Detemple et al. | |
| 5,704,049 A | 12/1997 | Briechle | |
| 5,873,025 A | 2/1999 | Evans et al. | |
| 5,884,278 A * | 3/1999 | Powell | G06Q 20/20 235/375 |
| 5,897,622 A | 4/1999 | Blinn et al. | |
| 5,929,770 A | 7/1999 | Faita | |
| 6,047,263 A | 4/2000 | Goodwin, III | |
| 6,073,843 A | 6/2000 | Goodwin, III et al. | |
| 6,105,004 A | 8/2000 | Halperin et al. | |
| 6,108,367 A | 8/2000 | Herman et al. | |
| 6,128,520 A | 10/2000 | Minoz | |
| 6,130,603 A | 10/2000 | Briechle | |
| 6,173,268 B1 | 1/2001 | Goodwin, III | |
| 6,179,206 B1 * | 1/2001 | Matsumori | G06Q 20/343 235/375 |
| 6,202,923 B1 | 3/2001 | Boyer et al. | |
| 6,205,396 B1 | 3/2001 | Teicher et al. | |
| 6,290,128 B2 | 9/2001 | Goodwin, III | |
| 6,314,406 B1 * | 11/2001 | O'Hagan | G06K 7/0004 705/14.23 |
| 6,334,181 B1 | 12/2001 | Boutaud et al. | |
| 6,360,207 B1 | 3/2002 | Goodwin, III | |
| 6,507,868 B2 | 1/2003 | Simmon et al. | |
| 6,520,411 B1 | 2/2003 | Goodwin, III | |
| 6,542,873 B1 | 4/2003 | Goodwin, III et al. | |
| 6,542,933 B1 | 4/2003 | Durst, Jr. et al. | |
| 6,553,489 B1 | 4/2003 | Osler et al. | |
| 6,625,581 B1 | 9/2003 | Perkowski | |
| 6,696,920 B1 | 2/2004 | Goodwin, III et al. | |
| 6,976,206 B2 | 12/2005 | Haulk et al. | |
| 6,993,498 B1 * | 1/2006 | Deaton | G06Q 20/20 705/14.23 |
| 7,010,501 B1 * | 3/2006 | Roslak | G06Q 20/20 705/23 |
| 7,379,899 B1 | 5/2008 | Junger | |
| 7,433,834 B2 | 10/2008 | Joao | |
| 7,856,237 B1 | 12/2010 | Peter et al. | |
| 2001/0000406 A1 * | 4/2001 | Goodwin, III | G06Q 30/06 235/383 |
| 2001/0018660 A1 | 8/2001 | Sehr | |
| 2001/0032266 A1 | 10/2001 | Minowa | |
| 2002/0010686 A1 | 1/2002 | Whitesage | |
| 2002/0042722 A1 | 4/2002 | Tsuji | |
| 2002/0045436 A1 | 4/2002 | Ekanayake | |
| 2002/0082931 A1 | 6/2002 | Siegel | |
| 2002/0095342 A1 | 7/2002 | Feldman et al. | |
| 2002/0170961 A1 | 11/2002 | Dickson et al. | |
| 2002/0173972 A1 | 11/2002 | Daniel et al. | |
| 2002/0174009 A1 | 11/2002 | Myers et al. | |
| 2002/0178091 A1 * | 11/2002 | O'Hagan | G06K 7/0004 705/26.1 |
| 2002/0184111 A1 | 12/2002 | Swanson | |
| 2002/0194069 A1 | 12/2002 | Thakur | |
| 2002/0194075 A1 * | 12/2002 | O'Hagan | G06Q 20/201 705/21 |
| 2002/0196204 A1 * | 12/2002 | Matthew Senn | A47F 9/046 345/30 |
| 2003/0088471 A1 | 5/2003 | Tanigaki et al. | |
| 2003/0167203 A1 * | 9/2003 | Thorne | G06Q 30/02 705/14.26 |
| 2003/0234288 A1 | 12/2003 | Canipe et al. | |
| 2004/0024651 A1 | 2/2004 | Daniel et al. | |
| 2004/0046027 A1 | 3/2004 | Leone et al. | |
| 2004/0064370 A1 | 4/2004 | Powell | |
| 2004/0238637 A1 | 12/2004 | Russell et al. | |
| 2004/0243517 A1 | 12/2004 | Hansen | |
| 2005/0109844 A1 | 5/2005 | Hilliard | |
| 2006/0011720 A1 | 1/2006 | Call | |
| 2012/0205433 A1 | 8/2012 | Dudek | |

OTHER PUBLICATIONS

International Preliminary Examination Report dated Jun. 17, 2004 for PCT/US03/16803.

\* cited by examiner

AUTOMATIC PRICE DISPLAY CONTROL BY EMULATION OF ELECTRONIC CASH REGISTER PRICE LOOKUP

CROSS-REFERENCE TO RELATED APPLICATIONS

This application is a continuation application of U.S. patent application Ser. No. 14/729,637, filed Jun. 3, 2015, which is a divisional application of U.S. patent application Ser. No 13/168,574, filed Jun. 24, 2011, now U.S. Pat. No. 9,058,621, issued Jun. 16, 2015, which is a continuation application of U.S. patent application Ser. No. 12/230,237, filed Aug. 26, 2008, now U.S. Pat. No. 7,997,487, issued Aug. 16, 2011, which is a divisional application of U.S. patent application Ser. No. 10/446,791, filed May 29, 2003, now U.S. Pat. No. 7,433,831, issued Oct. 7, 2008, which claims priority under 35 U.S.C. § 119 to U.S. Provisional Patent Application No. 60/384,833, filed Jun. 4, 2002. The content of each prior application is hereby incorporated by reference in its entirety.

TECHNICAL FIELD OF INVENTION

The present invention relates to electronic displays. In particular, the present invention relates to emulation of an electronic cash register at a product's shelf to provide pricing and other relevant information regarding the product.

BACKGROUND

Electronic pricing systems are ubiquitous in the retail industry, as well as some wholesale industries. The advantages of electronic pricing systems are numerous: up-to-the minute inventory status and control, ability to monitor sales data (i.e., how "fast" a particular sales register operates, average dollar per transaction, etc.) and, as a result, decreasing inventory costs by purchasing replacement items only when absolutely necessary. As product is moved into a store, and then into warehouse storage, data can be accumulated (how much product received, where stored, date and time) and can be compared to sales data to see how product has "moved" from receiving to final purchase by a customer. These systems have revolutionized the retail industry, and hardly any store exists which does not use some of electronic pricing system.

An electronic price system used in retail establishments is described in U.S. Pat. No. 4,139,149 (the '149 patent), issued to Crepeau et al., the system including a computer, point of sale terminals, and product code readers at the point of sale terminals including an electronic price display system. The display system has plural display units, with one display unit at each of the locations in the store where items are held for sale. The computer controls both the prices which are displayed by the display units and the prices which are charged to customers at the point of sale terminals. The display units are connected in an electrical series by data transmission line, and price information is transmitted by the computer over the transmission line to the display system in the same order as the display units are connected.

The '149 patent arranges the display units in a particular order. The computer shifts data out, to each display, which are connected in series. Data corresponding to the last display in line is sent first, data for the second to last display data is sent second, and so on. The '149 patent requires specialized software and hardware to use UPC data that is used in electronic cash registers. The '149 patent describes displays that are connected by data transmission lines only, i.e., that are hardwired.

An electronic price display system used in retail establishments is also described in U.S. Pat. No. 4,002,886 (the '886 patent), issued to Sundelin. The '886 patent describes an electronic price display unit, which can be remotely addressed and in which the price displayed can be remotely set. The device of the '886 patent attempts to ensure that the price displayed for an item is identical to the price actually charged for the item. The '886 patent requires special software to correlate the addresses of the display units and the types of items displayed nearby. Additionally, the '886 patent creates a unique hardware arrangement to use the specialized output of the special software to receive the correct information (i.e., if a different pricing protocol was used, the device of the '886 patent would not be able to function properly).

FIG. 1 is a schematic diagram showing the incorporation of electronic price display units in a system in which a computer supplies price information to one or more point-of-sale terminals.

With reference to FIG. 1, in which arrows indicate the direction of information flow, prices of items of merchandise for sale by a retail sales business are stored in the memory of a central computer 112. This computer may be linked to a master computer 106 when said retail sales business operates more than one store. The master computer, if existent, could be used to update price and other information. Otherwise, the central computer 112 would be used for this purpose. When an item is being sold, a product code reader 116, of which there may be more than one, is used to read and decode the product code 121 printed on said item. This decoded information is transmitted to an associated point-of-sale terminal 115, which transmits said information to the central computer 112. In response, the central computer transmits the price of said item to the point-of-sale terminal 115, which adds said price to an accumulating total of the prices of all items being sold in a particular transaction. The details of the process described above may be altered by distributing the circuit functions and interconnections differently, without altering the basic process.

One or more electronic price display units 117 are used in conjunction with the central computer 112 as follows. The internal address code of each price display unit is correlated in the store computer memory with the product code of the item or items whose price said price display unit is to display, where said product code 121 is the same product code read by the product code reader 116. Each price display unit 117 is placed adjacent to the display area of the item or items whose price it is to display. Each price display unit 117 is connected to the central computer 112, from which it receives electrically coded information. The means for connection of said price display unit 117 to said central computer 112 may comprise wires or other conductors, electromagnetic transmission and reception, acoustic transmission and reception, or any combination of such means. Connection to said central computer 112 shall be construed to include any interface or interfaces used. Shelf buses 119 are mounted on the edges of product display shelves. The electronic price display units 117 are connected to the shelf buses 119.

The correlation in the store computer memory between the address code of an electronic price display unit 117 and the product code of an associated item or items may be formed by visually reading the externally readable address code of said electronic price display unit 117 and reading said product code and by entering this information into said computer. This process would not have to be repeated until product display areas were rearranged.

Once the product codes 121 and display unit address codes have been correlated in the store computer memory, the current price of any item, and other relevant information, can be transmitted by the computer to any price display unit as electrically coded information. The source of displayed price information is thus the same as the source of the price information used by the point-of-sale terminals, thereby ensuring that the displayed price and the price charged are identical.

Electronic pricing systems are based on electronic scanners, or universal product code (UPC) readers. A UPC reader can "read" the universal product code (UPC) of a particular product viewed by the scanner. A UPC consists of a series of lines or "bars" of varying widths, which represents coded information. By "coded" it is meant that the different widths of the bars, and the spaces between them, have been specifically created to represent information (similarly to, for example, the dots and dashes of the morse code which represents letters and numbers). In this case, the encoded information is product information, including at least the manufacturer (e.g. "Campbell"), the product type ("instant soup mix"), and perhaps other information as well. All this information is included in an alpha-numeric code, which can then be used to ascertain the price of the product. This is done in the central computer 112, by means of a price look-up (PLU) table 124. PLU table 124 is simply a table, with all the product "names" (actually the alpha-numeric "words") as one column, and the corresponding prices in the second column. Master computer 106 can also have a PLU, although it is shown as master PLU 126, because master computer 106 could service different retail establishments, each with different products sold.

A real time computer driven retail pricing display system is described in U.S. Pat. No. 4,500,880, (the '880 patent), issued to Gomersall et al. The '880 patent describes a computer driven informational display system which visually displays selected information in real time. The arrangement is particularly adapted for displaying pricing and other associated information in retail establishments which utilize a standard universal product code for the items of merchandise for sale. The particular bar code forms a unique address for respective remote display modules at selected locations throughout the store. A source of computer based information is applied to all of the remote display units in parallel. When a particular display module detects its unique address, the information to be displayed, which follows the address code, is processed and used to control the operation of an LCD display.

The chief feature of the '880 patent is that the displays are hardwired to the store base computer, which carries both power and data. Therefore, specialized hardware is required for the electronic displays. Additionally, special software is required to address the data. As described above, the unique addresses are in fact the UPC codes themselves. The UPC codes are then followed by the data, i.e., pricing information, which is sent to each particular display, depending on the product displayed there.

Thus, as described above there are particular problems in the prior art such as the use of specialized hardware, which is both costly to purchase, costly to maintain, and more importantly prone to failure which reduces the on-time performance and can result in loss of sales. Additionally, specialized software is required in all the foregoing prior art systems, again resulting in extensive modifications to existing electronic pricing systems, requiring additional expenditures of capital. These software systems are again prone to failure and cause existing systems to malfunction, which result in lost sales because of downtime. Also, some of the prior art systems require elaborate communication schemes, which require meticulous planning of electronic pricing displays, which, in a retail store establishment, is not conducive to creating a particular traffic flow of consumers in a manner most conducive for maximizing sales. None of these prior art systems discussed the ability for bidirectional communication ability, or the ability to display any information other than prices.

The presence of specialized electronic price display interface software at the heart of a store's price management system can be both non-robust and create a security risk unless the software is completely customized and tested for a particular system design. This makes the use of electronic pricing signs owned ny others than the retailer, such as branded consumer products manufacturers, prohibitively difficult and expensive to install and manage. Either the store must incorporate "foreign" software into the heart of it's pricing system or must create and manage a separate system for each manufacturer who would wish to electronically display an accurate price on manufacturer provided in-store merchandisers as are common in retail. As a result, the manufacturer's in-store merchandisers are normally provided with either hand-written prices or simple stick-on numbers for pricing, and expensive and difficult to maintain method which can lead to disparities between the posted price and the selling price as listed by the electronic cash register's price look-up system.

Thus, a genuine need has been shown and demonstrated for an electronic pricing display system, which does not require specialized hardware or software, which interacts within an existing electronic pricing display system seamlessly and without large expenditures of additional capital, and/or does not impose any changes or modifications to the existing system, wherein such a system will have the ability for bidirectional communication, the ability to display information other than price, and interact in a manner not affecting existing systems.

SUMMARY OF THE INVENTION

A merchandising system is provided for the distribution and display of product information, that includes a master database, located at a regional sales/management location, the master database containing a price-look up (PLU) table which correlates prices of products and universal product codes (UPC) that are contained on the products. The system communicates between the master database and a central database located within a retail establishment. The central database communicates the UPC price and sales data to electronic cash registers (ECR's) as well as an ECR emulation hub. The ECR emulation hub appears as an ECR to the central database, and can translate the product price and sales information into a format that an electronic price display unit—which communicates with the ECR emulation hub—can use to display price and sales information.

The invention provides a system for the distribution and display of product information in a retail establishment, having at least a master database host, which in turn can include at least a computer, communication interface, and a memory containing a master database; a central computer, located at a retail establishment, having at least a memory, and a first communication interface for communicating with the master database host and a second communication interface for communicating with one or more electronic cash registers located in the retail establishment; an electronic price display unit; and an electronic cash register emulation hub, for translating product information in a universal price code format to the electronic price display unit format.

The invention also provides a method for the distribution and display of product information in a retail establishment, including at least the steps of transmitting product information from a master database to a central database located at a retail establishment; transmitting product information from a central database to an electronic cash register emulation hub; translating product information from a universal price code format to an electronic price display unit format in the electronic cash register emulation hub; transmitting the translated product information from the electronic cash register emulation hub to the electronic price display unit; and displaying the translated product information on the electronic price display unit.

Th invention also provides for logging of sale prices for tracked products. The selling prices of these products can be recorded at the electronic cash register emulation hub to automate the tracking of prices at retail establishments for verification and auditing of the pass through of manufacturer's promotions by the retail establishment. This price log can be maintained in removable or on-board memory, and/or transmitted via a network or the internet to an auditing authority such as the product's manufacturer.

BRIEF DESCRIPTION OF THE DRAWINGS

The invention, as well as other features and advantages thereof will be best understood by reference to the detailed description of the specific embodiments which follows, when read in conjunction with the accompanying drawings, in which.

DETAILED DESCRIPTION OF THE INVENTION

Figure 1:
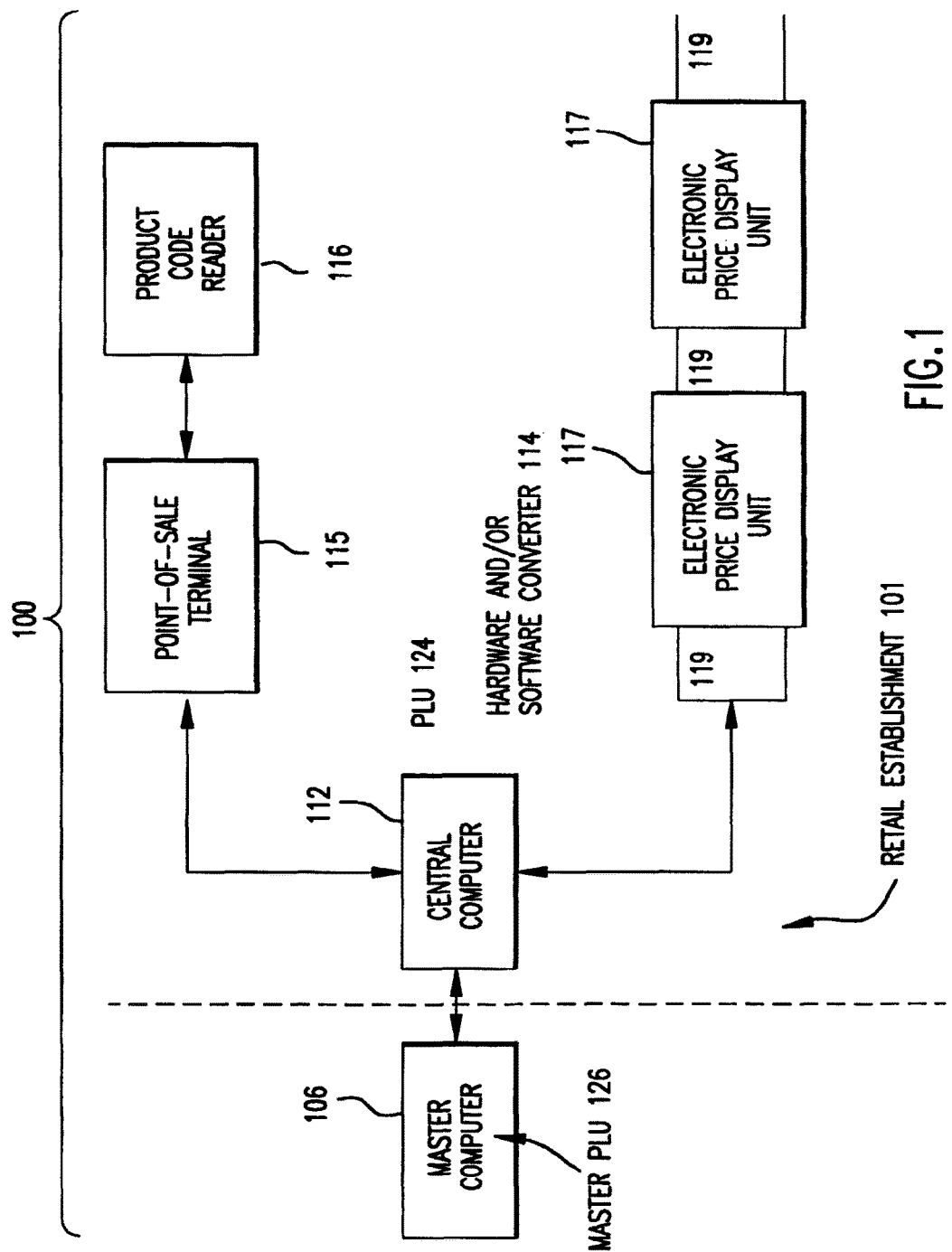
FIG. 1 illustrates a prior art system for electronic distribution of pricing data in a retail establishment.

The various features of the invention will now be described with reference to the figures, in which like parts are identified with the same reference characters.

Figure 1A:
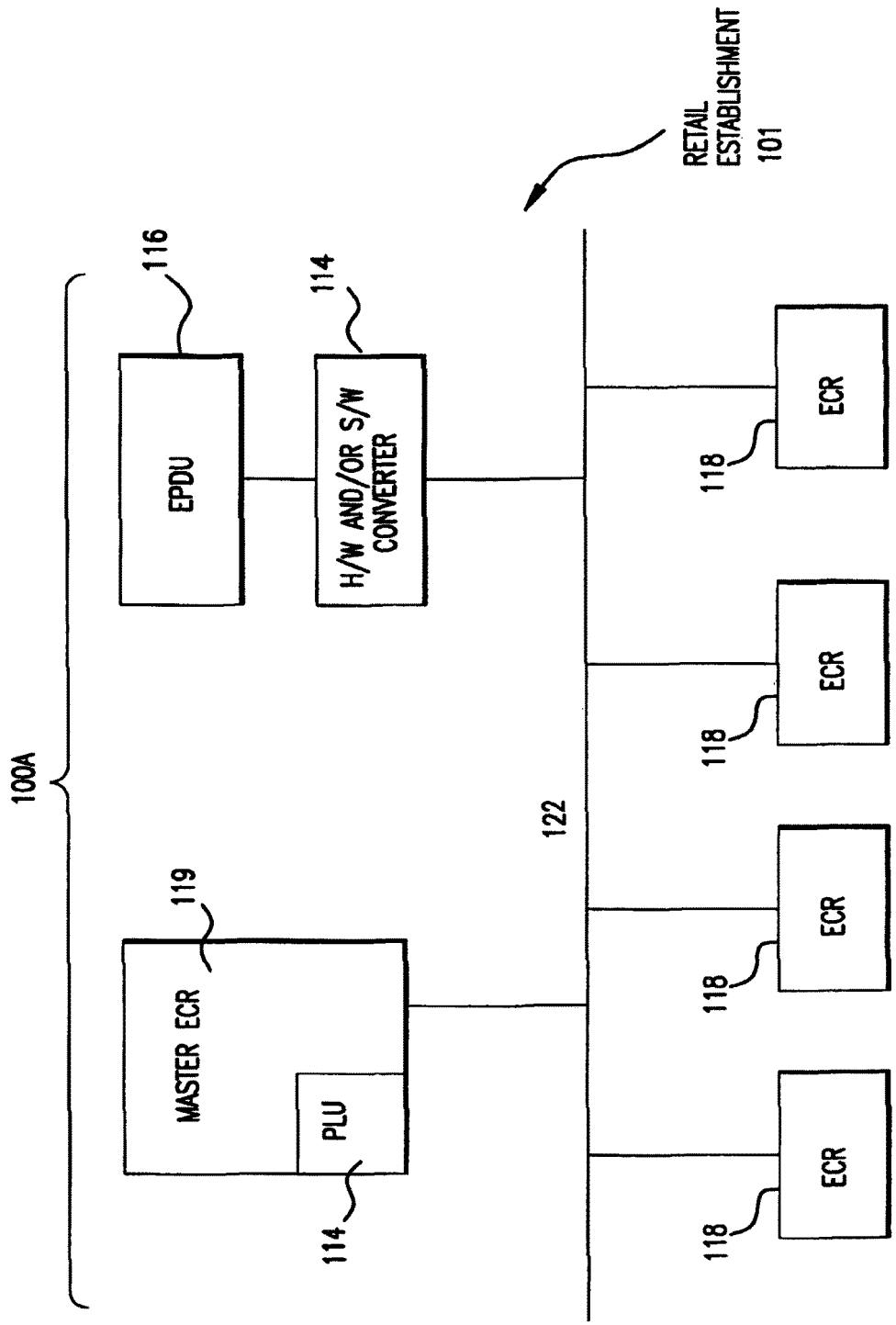
FIG. 1A illustrates an electronic price display system including connected cash registers where a PLU can be modified on one register and then "sent" to the others to maintain a coherent price for all ECR's.

FIG. 1A illustrates a system for electronic distribution of pricing data 100A using a master ECR 119 in retail establishment 101. In the electronic pricing system 100A of FIG. 1A, master ECR 119 communicates with other electronic cash registers 118 via communications bus 122. Master ECR 119 contains PLU 114, as did the central computer 112. ECRs 118 communicate with master ECR 119, querying the PLU 114 for price information, as they did with the central computer 202. The manner in which the electronic price system 100 of FIG. 1A operates is essentially the same as the electronic price system of FIG. 1. However, because there is no central computer 202 or master computer 106, the ability to monitor sales information, or input price information, is somewhat more difficult.

Electronic pricing systems are based on electronic scanners, or universal product code (UPC) readers. A UPC reader can "read" the universal product code (UPC) of a particular product viewed by the scanner. A UPC consists of a series of lines or "bars" of varying widths, which represents coded information. By "coded" it is meant that different widths of the bars, and the spaces between them, have been specifically created to represent information (similarly to, for example, the dots and dashes of the morse code which represents letters and numbers). In this case, the encoded information is product information, including at least the manufacturer, the product type, and perhaps other information as well. All this information is included in an alpha-numeric code, which can then be used to ascertain the price of the product. This is done in the central computer 112, by means of a price look-up (PLU) table 124. PLU table 124 is simply a table, with all the product "names" (actually the alpha-numeric "words") as one column, and the corresponding prices in the second column. Master computer 106 can also have a PLU, although it is shown as master PLU 126, because master computer 106 could service different retail establishments, each with different products sold.

Figure 2:
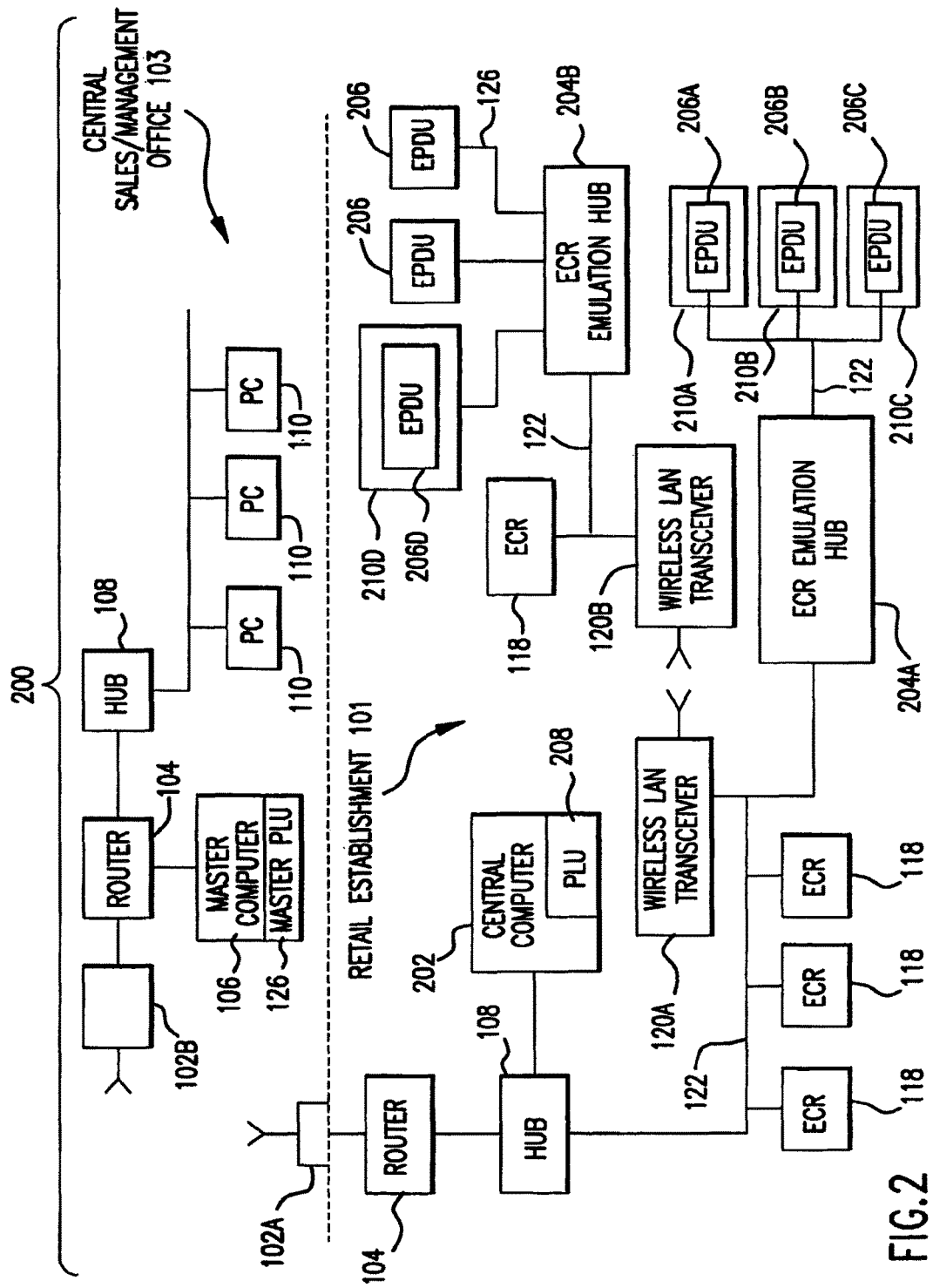
FIG. 2 illustrates a system for electronic distribution of product information in a retail establishment, according to an embodiment of the invention.

FIG. 2 illustrates a system for electronic distribution of product information in a retail establishment, according to an embodiment of the invention. The electronic pricing distribution system 200 of FIG. 2 contains some of the same components as the prior art electronic pricing system of FIG. 1. Similar components have been identically labeled. However, electronic pricing distribution system 200 contains additional features, which include an electronic cash register (ECR) emulation hub 204 and electronic price display unit (EPDU) 206.

In the embodiment of an electronic pricing distribution system shown in FIG. 2, an ECR 118 requests product information from central computer 202 and the product information is retrieved from PLU 208. The features of PLU 208 will be discussed in detail later. The product information, after being retrieved from PLU 208, is transmitted to the appropriate ECR 118 via communications bus 122. Communications bus 122 can be a RS232, ethernet, twisted pair, or any other type of hard-wired communications bus. If the retail establishment 101 is large enough, and has remotely located ECRs 118, then wireless transceivers 120A and 120B might be employed. Wireless LAN transceiver 120A communicates with wireless LAN transceiver 120B, which in turn communicates via communications bus 122 to other ECRs 118, to send price data. The operation of the electronic pricing distribution system 200 can thus perform the operations of the electronic pricing distribution systems 100 of the prior art, described above.

For certain commercial enterprises, a central sales/management office 103 is included. Communications between retail establishment 101 and the central sales/management office 103 can be accomplished via VSAT dishes 102A and 102B, as has been discussed previously. Product information can be sent from the master computer through the central computer, to the appropriate ECR 118, by request of the particular ECR 118. Or, product information can be sent from the central computer on a regularly scheduled, or unscheduled basis. The central computer will respond to requests from locally operated ECRs 118, as discussed in reference to the electronic pricing distribution system 100 of FIG. 1.

ECR emulation hub 204 of FIG. 2 operates, as far as the central (or master) computer 202 is concerned, in the same manner as ECR 118. No special software or hardware is needed to operate the electronic pricing distribution system 200 according to this embodiment of the invention. ECR emulation hub 204 receives the same communications via communication bus 122, as ECRs 118. ECR emulation hub 204, is programmed to respond or acquire information for particular products, i.e., for particular UPCs. Therefore, when product information is sent from the central computer 202 to the various electronic cash registers 118 via communications bus 122, ECR emulation hub 204 will acquire only the specific data for products and merchandise for which it supports. For example, an ECR emulation hub could be located in one part of the store, which supports half a dozen or more different merchandise displays. The merchandise could be any merchandise whatsoever from foods and beverages to household goods or personal items, for example cigarettes. Product information is placed on communications bus 122. Normally, only one ECR 118 would receive and retain the data—the ECR 118 that requested it. However, in the electronic pricing distribution system 200 of the present invention, the ECR emulation hub 204 which supports the product will also receive and retain the product information. ECR emulation hub 204 communicates with EPDUs 206 (wired or wireless). Each EPDU 206 is positioned to provide product information for a select number of proximately located products or merchandise. As is well known to those skilled in the art, advertisement information (i.e., price) can be displayed in close proximity to the corresponding product. Therefore, ECR emulation hub 204 can determine which EPDU to send appropriate product information to.

For example, in FIG. 2, EPDU 206A could provide product information for beverage items, located in display case 210A. When new information is input to the central computer 202 in PLU 208, or when the product is purchased from any ECR 118 for a beverage item which ECR emulation hub 204A supports, that information is retrieved by ECR emulation hub 204A as well as the specific ECR 118. Once that occurs, ECR emulation hub 204A will update its memory for the specific UPC code and correlating price, and output a message (price data) to be sent to the particular EPDU (EPDU 206A, located at display case 210A), which corresponds to the particular beverage item. It has therefore been established that no specialized hardware or software is needed to properly display product information for particular products or merchandise for sale. The ECR emulation hub can thus emulate an electronic cash register and act as a hub to various EPDU 206. Similarly, remote ECR emulation hub 204B, which communicates to central computer 202 via wireless LAN transceivers 120A and 120B, can operate in the same manner.

Another aspect of ECR emulation hub 204, is its bidirectional communication ability. Regarding this aspect, ECR emulation hub 204 can request product information from central computer 202 for any product supported by ECR emulation hub 204. This can be done on a regular basis, in order to maintain the most current product information, or it can be done per request. A product information request mechanism 606 can be included near or on EPDU 206 which is located near the product or merchandise it supports, whereupon a customer can request instant product information (see FIGS. 6 and 7 for an illustration of EPDU 206A and EPDU 207, which shows product information request mechanism 606. The discussion of FIGS. 6 and 7 includes operation of the product information request mechanism; product information request mechanism is not shown on EPDU 206A in FIG. 2). In this case, ECR emulation hub 204 performs the same operation as ECR 118 that requests a price for a particular UPC. This process was described in detail with respect to FIG. 1. Sales information includes special promotions or marketing techniques for purchases of higher quantity of the items, or the purchase of a combination of products or merchandise. Remote ECR emulation hub 204B, which communicates with the central computer 202 via wireless LAN transceivers 120A and 120B, also has bidirectional communication ability. Therefore a customer across the store at display case 210D can request the same type of information via EPDU 206D and product information request mechanism 606, connected to remote ECR emulation hub 204B, as another customer at display case 210A who communicates via EPDU 206A which is hardwired through ECR emulation hub 204A to central computer 202. Although the hardware interfaces are different, there is no difference in the ability to display the most current pricing, to request the most current pricing, to request most current sales information, or to receive the most current sales information. Additionally, the ECR emulation hub can keep records of prices actually charged for particular products over time to allow for automatic auditing of promotional pricing offers such as those made by manufacturers of the product. This price tracking can either be stored locally in fixed and/or removable memory, and/or transmitted back to an auditing authority via a network or the internet.

If the retail establishment 101 is part of a larger organization, and is configured to communicate with a central sales/management office 103, then ECR emulation hub 204 will access master computer 106 as in the case of ECR 118. Product information could be requested on a per-request basis. This would also be true for sales information. Or, if direct access is not allowed from ECR 118 (and therefore from ECR emulation hub 204), then ECR emulation hub 204 will receive the product information from the central computer 202, as other ECRs 118 do.

Figure 3:
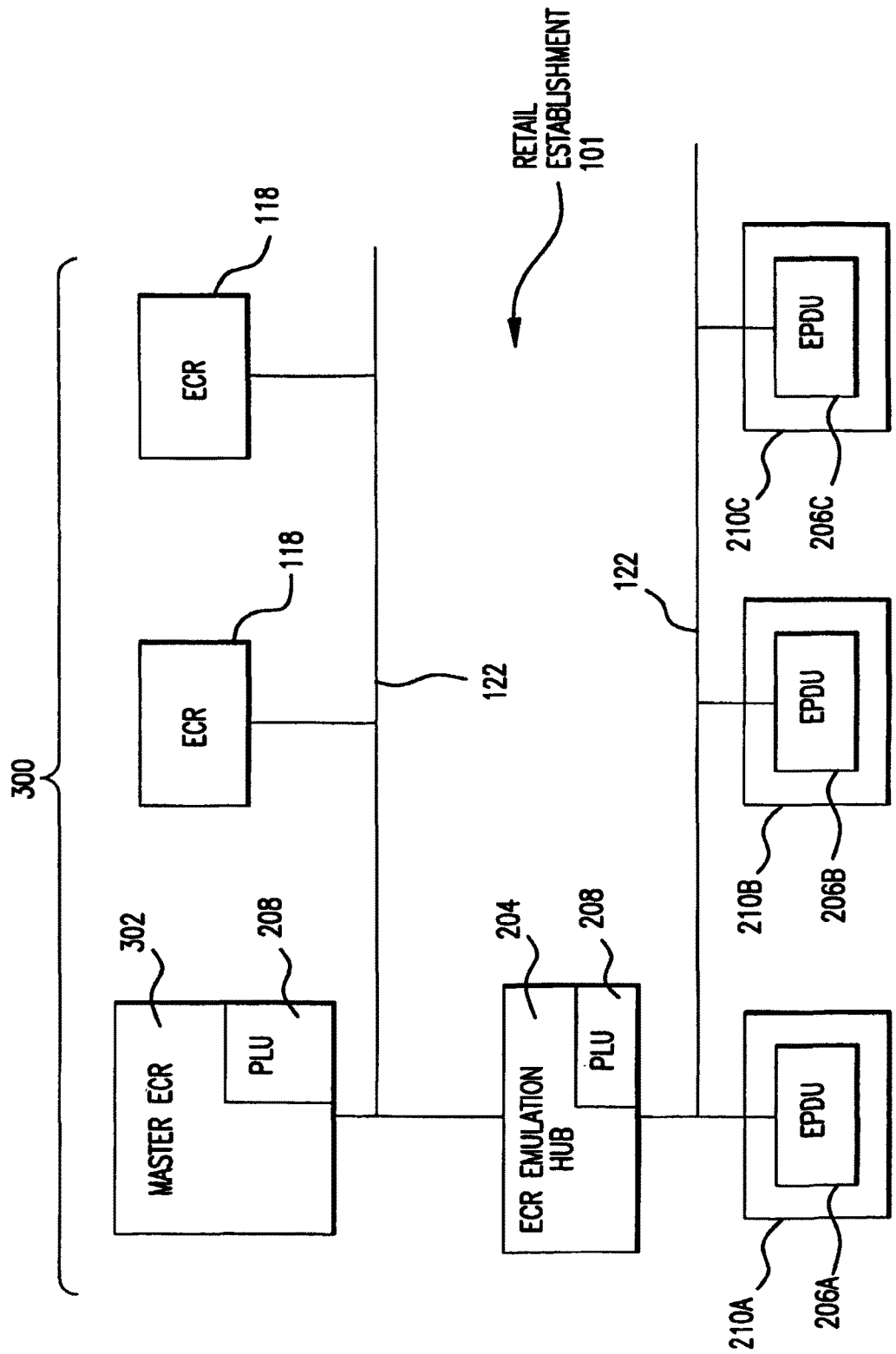
FIG. 3 illustrates a system for electronic distribution of product information in a retail establishment, according to an embodiment of the invention.

FIG. 3 illustrates a system for electronic distribution of product information in a retail establishment, according to an embodiment of the invention. The electronic pricing distribution system 300 of FIG. 3 resides in a retail establishment 101 and includes a master ECR 302 and additional ECRs 118, which communicate between themselves via communication bus 122, and also to ECR emulation hub 204. ECR emulation hub 204 communicates via another communication bus 122 to EPDUs 206A-C. Instead of a central computer 202 with central PLU 208 as described in FIG. 2, master ECR 302 contains central PLU 208. Various means are afforded for inputting data to master ECR 302 for central PLU 208. For example, master ECR 302 could have a floppy disk reader, a special memory card reader, an internet connection, or another I/O that interfaces or communicates with an external computer (such as a laptop).

In operation, when a customer scans or has scanned a product or merchandise for sale, the ECR 118 at which the product or merchandise was scanned will acquire the UPC, transmit it to the master ECR 302 (via hardwired or wireless means) and the master ECR 302 will access its central PLU 208 to determine the price that matches the UPC. The price will then be transmitted back to the originating ECR 118 (the one at which the product was scanned). As was described with respect to FIG. 2, the price information is communicated to ECR emulation hub 204 which stores such information in its own memory, and transmits it to the proper EPDU 206A, 206B or 206C. As shown and discussed in FIG. 2, ECR emulation hub 204 knows it has one or more EPDUs 206 attached to it, each particular one corresponding to a particular display of a particular product price or merchandise for sale. Sales information can be displayed at the EPDU 206 as was discussed previously. Whether sales information can be transmitted to ECR emulation hub 204 and EPDU 206 depends on whether master ECR 302 has the capability of retaining and transmitting sales information.

A customer can request product information from the master ECR 302, as was discussed with respect to FIG. 2. Master ECR 302 can push product information on a regular basis, or when requested, via the product information request mechanism 606 located at EPDUs 206A-C.

In an alternative embodiment, the ECR's can be small ECR's that have a self-contained PLU, which is linked not to scanned barcode inputs, but to simple price lookup keys where each key is assigned to a popular product. There may be dozens of these assigned keys as well as multiplexed keys such as shift+key to obtain more individual product lookups. These small ECR's are linked together so that price lookup table when modified on one ECR (the master) can be electronically copied to the other ECR's connected to the master ECR. In this manner, the ECR emulating electronic display control unit receives the updated price for a particular item just as the other ECR's get their PLU's updated. In this arrangement, the ECR emulator is instructed as to which particular PLU entry represents which particular product via a simple one-time configuration linking a product's identity and thus its price display to a virtual PLU key and thus to a specific PLU table entry.

Figure 4:
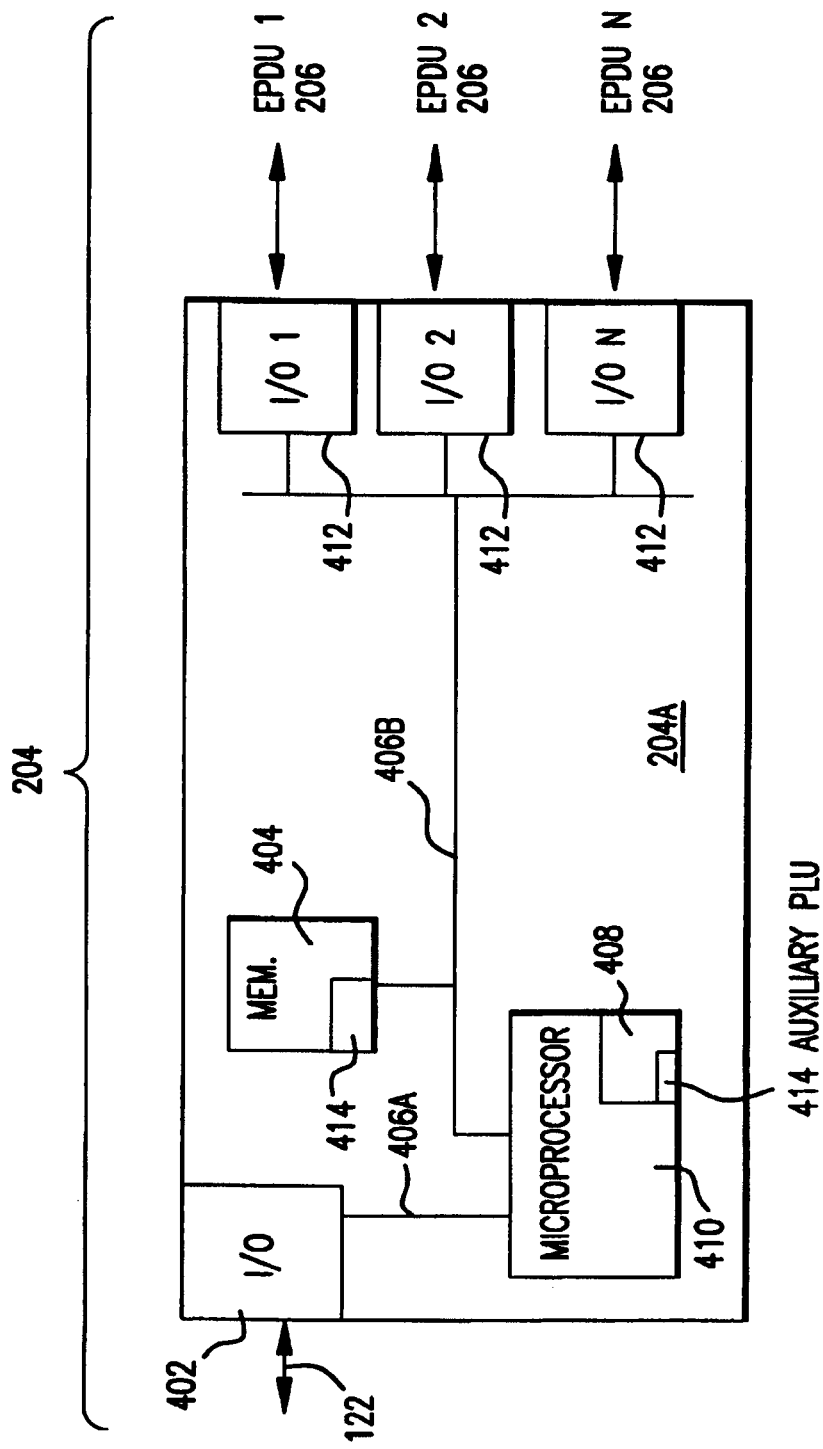
FIG. 4 illustrates an ECR emulation hub according to an embodiment of the invention.

FIG. 4 illustrates an ECR emulation hub according to an embodiment of the invention. ECR emulation hub 204 includes I/O 402, which is connected to microprocessor 410 via a first internal communications bus 406A. Microprocessor 410 communicates via second internal communications bus 406B to first memory 404 and second I/O 412. Within microprocessor 410, there may be a second memory 408. Second memory 408 or first memory 404, will contain the steps of a program, which when executed, carry out the functions of ECR emulation hub 204. Also, within either the first memory 404 or second memory 408, an auxiliary PLU 414 can be provided.

Auxiliary PLU 414 is similar to central PLU 208 and master PLU 126, in that it is a "table" that correlates UPC and price information. However, auxiliary PLU 414 also can contain (symbolically) a third column, entitled "Sales Information." Sales information, as discussed previously, is information about special offers (i.e., 2-for-1 deals, volume price discounts, etc.) for specific products. The sales information feature, if utilized, would require additional software at the central computer 202, master computer 106 or master ECR 302. However, because this is an additional feature, the electronic pricing distribution system, regardless of particular embodiment, does not require any hardware or software modifications to any existing price distribution system, to correctly display the most current price information.

The additional software mentioned above encompasses, among other features, a means for correlating UPC information, sales information and price information in control PLU 208 and master PLU 126. This does not necessarily have to be the case, however, but it can be made part of the pricing display system without adversely affecting the existing pricing display system.

I/O 402 receives data from master ECR 302, central computer 202 or master computer 106, and communicates the same via the first internal communications bus 406A to microprocessor 410. Second memory 408 or first memory 404 will retain the product information for each UPC that was transmitted. This product information is stored in auxiliary PLU 414. Auxiliary PLU 414 can either retain only that product information for products and merchandise associated with the EPDUs 206 connected to I/O 412, or, it can retain all product information placed on the first communication bus by the central computer 202, master computer 106 or master ECR. 302.

When new product information is received via I/O 402 and sent to microprocessor 410, auxiliary PLU 414 is updated (either in first memory 404 or second memory 408), and then retransmitted via second internal communications bus 406B to the appropriate I/O 412, which will then transmit it to the appropriate EPDU 206. Thereupon, EPDU 206 will display the information in the appropriate format. Software, which operates in the ECR emulation hub 204, will re-format the price and sales information into the format specified by the EPDU 206.

There are several reasons why product information would be sent from master computer 106, central computer 202, or master ECR 302, to ECR emulation hub 204. The first is that some ECR 118 has requested it. The second is that a consumer has utilized the product information request mechanism 606 to request product information, and the master ECR 302, central computer 202, or master computer 106 is sending product information in response to that request. Third, there might be an automatic update scheduled of product information from the central computer 202, master computer 106 or master ECR 302.

I/Os 412 can communicate bidirectionally with the EPDUs 206. Communications from an EPDU are received by I/O 412 and sent to microprocessor 410, through second internal communications bus 406B. Communications sent from an EPDU 206, through I/O 412, are for the purposes of requesting product information. Microprocessor 410 receives the request signal, and re-formats it to be sent to the master ECR, central computer or master computer. In this way, ECR emulation hub 204 acts like any other ECR 118 requesting price information (unless, of course it is sales information, in which case special software must be utilized).

Figure 5:
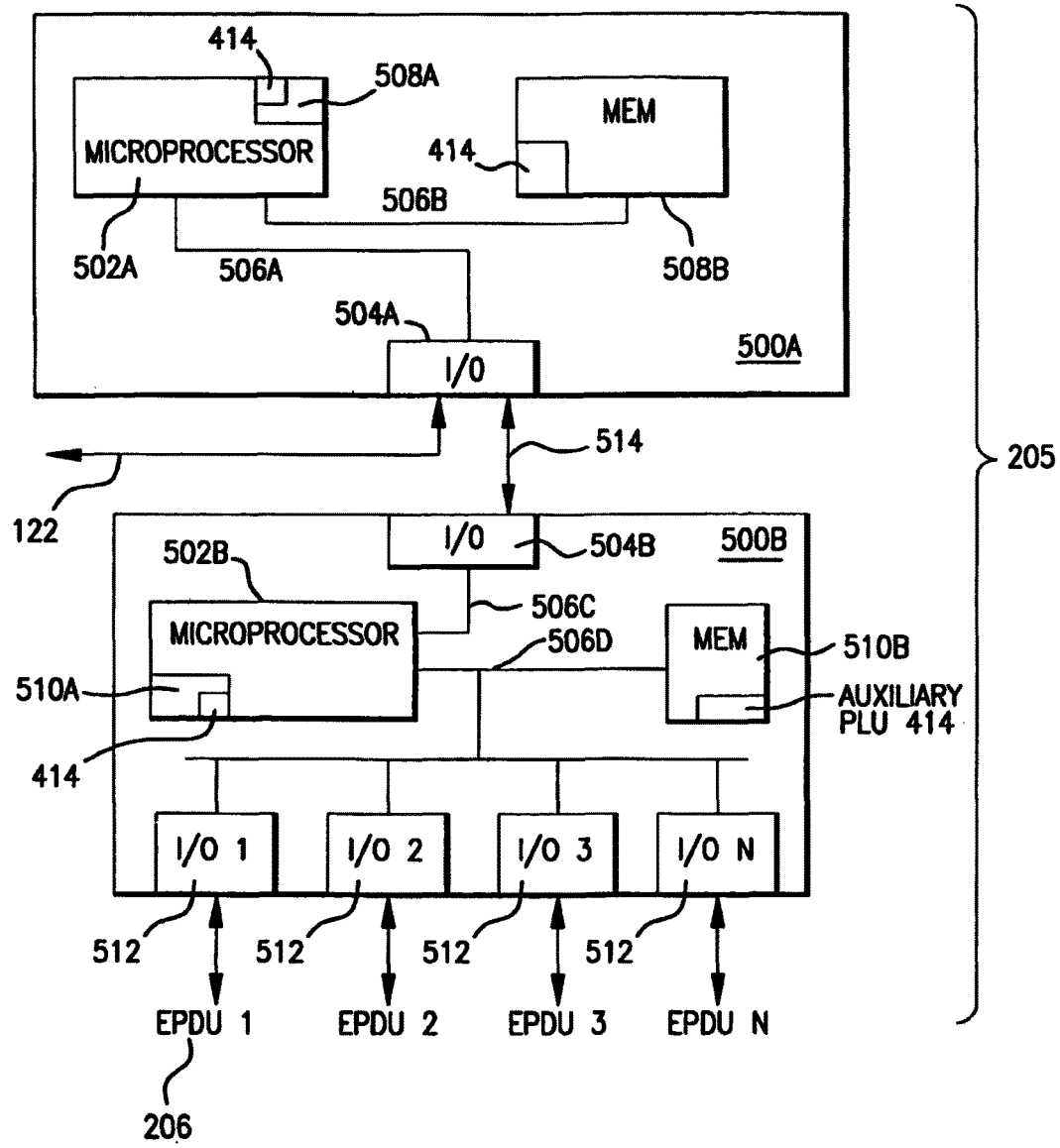
FIG. 5 illustrates an ECR emulation hub according to an embodiment of the invention.

FIG. 5 illustrates an ECR emulation hub according to an embodiment of the invention. The embodiment of ECR emulation hub 205 contains essentially the same components of the first embodiment of ECR emulation hub 204, but is divided into two different parts, ECR emulation hub A (EEHA) 500A and ECR emulation hub B (EEHB) 500B, and thus has additional components. These additional components extend its communication capability, but, both operate in exactly the same manner.

In EEHA 500A, I/O 504A connected to the first communication bus 122, and is connected to EEHA microprocessor 502A via first EEHA internal communications bus 506A. EEHA microprocessor 502A might have an internal EEHA memory 508A, and is connected to external EEHA memory 508B, via second EEHA internal communications bus 506B. Software instructions that enable EEHA 500A to perform as an ECR emulator are contained in either internal EEHA memory 508A, external EEHA memory 508B, or both (if both are present). Data that is received by EEHA microprocessor 502A, i.e., product information, is stored in the auxiliary PLU 414, which can reside in either internal EEHA memory 508A, external EEHA memory 508B, or both (if both are present). EEHA microprocessor 502A, upon receiving the appropriate instructions to send product information to an EPDU 206, will transfer the appropriate data via first EEHA internal communications bus 506A to EEHA I/O 504A and then to EEHB 500B.

EEHB 500B receives data from EEHA 500A via third communications bus 514, which is received by EEHB I/O 504B, and transmitted to EEHB microprocessor 502B, via first EEHB internal communications bus 506C. EEHB microprocessor 502B can have an internal EEHB memory 510A, and/or be connected to an external EEHB memory 510B, via second EEHB internal communications bus 506D. Second EEHB internal communications bus 506D connects EEHB microprocessor 502B to one or more EEHB I/O 512, which are then connected to EPDU 206, via appropriate means.

In operation, EEHB 500B receives data from EEHA 500A, and reformats it into the appropriate format depending on the type of EPDU connected to it, and transmits the data on the appropriate EEHB I/O port 512. EEHB 500B has the capability to handle greater numbers of EPDUs 206 than the first embodiment of ECR emulation hub 204. EEHB 500B will receive requests for product information from consumers operating the product information request mechanism 606 at an EPDU 206, and pass that request to EEHA 500A, which then passes the request to master ECR 302, master computer 106, or central computer 202, as the case might be. Therefore, in operation, both ECR emulation hub 204 and second embodiment of ECR emulation hub 205 operate in the same manner, though the functions of ECR emulation hub 204 are spread into two parts in the second embodiment of ECR emulation hub 205.

Figure 6:
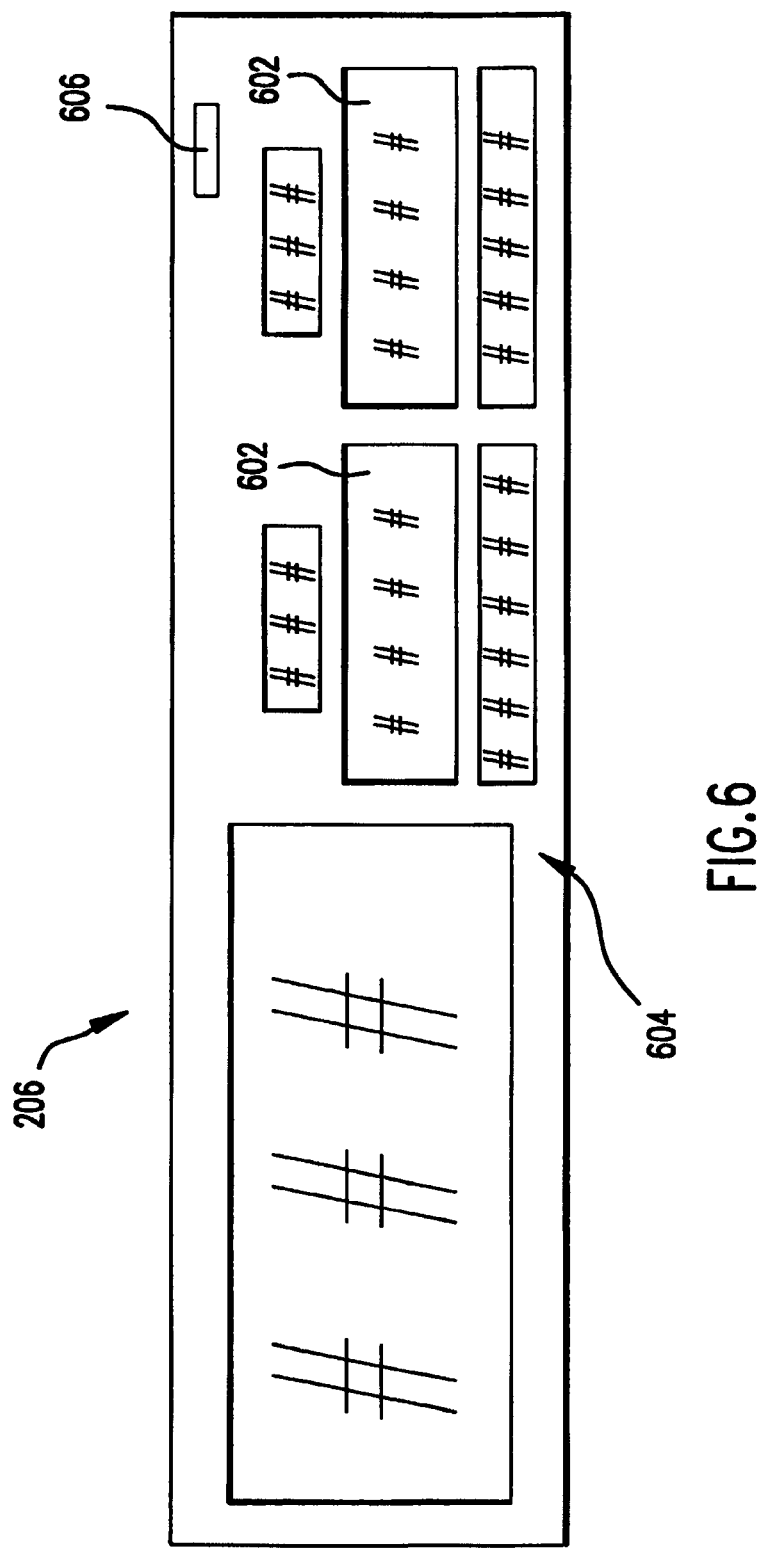
FIG. 6 illustrates an electronic pricing display unit, according to an embodiment of the invention.

FIG. 6 illustrates an electronic pricing display unit, according to an embodiment of the invention. Electronic pricing display unit 206 of FIG. 6 contains a display component 602 and a prepackaged component 604. The display component 602 is the electronic display component that receives, processes and ultimately displays the information communicated to EPDU 206 from ECR emulation hub 204 (or the second embodiment of ECR emulation hub 205; since the two are interchangeable, from hereon in, only ECR emulation hub 204 shall be discussed). There are many technologies available that are capable for use in a display of this nature, including LEDs, electrophoretic, electrochromic, electro-luminescent, plasma, LCD's, CRT's, etc. In this instance, that is, EPDU 206, only pricing information can be displayed.

EPDU 206 is located in a display case 210, for a particular product, e.g., cigarettes or soft drinks. Each EPDU 206 has its own particular address. This address can be known by virtue of the particular I/O port it is attached to at the ECR emulation hub 204, or, if communications are through wireless means, an alpha-numeric code, that is known to the ECR emulation hub 204, and is included in any data transmission intended for the particular EPDU 206. The ECR emulation hub 204 has storage means (i.e., a "table") to correlate EPDUs 206 and the products they support. Thus, for example, ECR emulation hub 204A might have 10 EPDUs 206 connected to it, and EPDU 206A displays price and/or sales information for cigarettes or soft drinks. EPDU 206B, also connected to ECR emulation hub 204, might display price and/or sales information for a popular soft drink, and so on. This information—which EPDU 206 supports what product—is stored in an appropriate memory in ECR emulation hub 204A. Additionally, since there may be one or more types of EPDUs 206 connected to ECR emulation hub 204, each with its own data format scheme, data refresh rate and/or other requirements, a table of EPDU display requirement information is kept in the appropriate memory at the ECR emulation hub 204. It is possible that EPDU 206 will have the capability to transmit its particular EPDU display requirement information to the ECR emulation hub 204, upon connection, power up, through regular transmission, or upon request.

The EPDU 206 of FIG. 6 also contains a product information request mechanism 606. The product information request mechanism 606 is a button, or lever, or other well known electro-mechanical device (which sends a signal upon activation) that is used by a potential consumer to request the most current product information. An electrical signal is generated upon activation, which is received by the EPDU 206 processing means, and the appropriately formatted message is sent to ECR emulation hub 204, conveying the message that product information is requested for a particular product. The ECR emulation hub then forwards the request to the central computer 202, master computer 106 or master ECR 302, whereupon the message is processed, as has been previously described.

Figure 7:
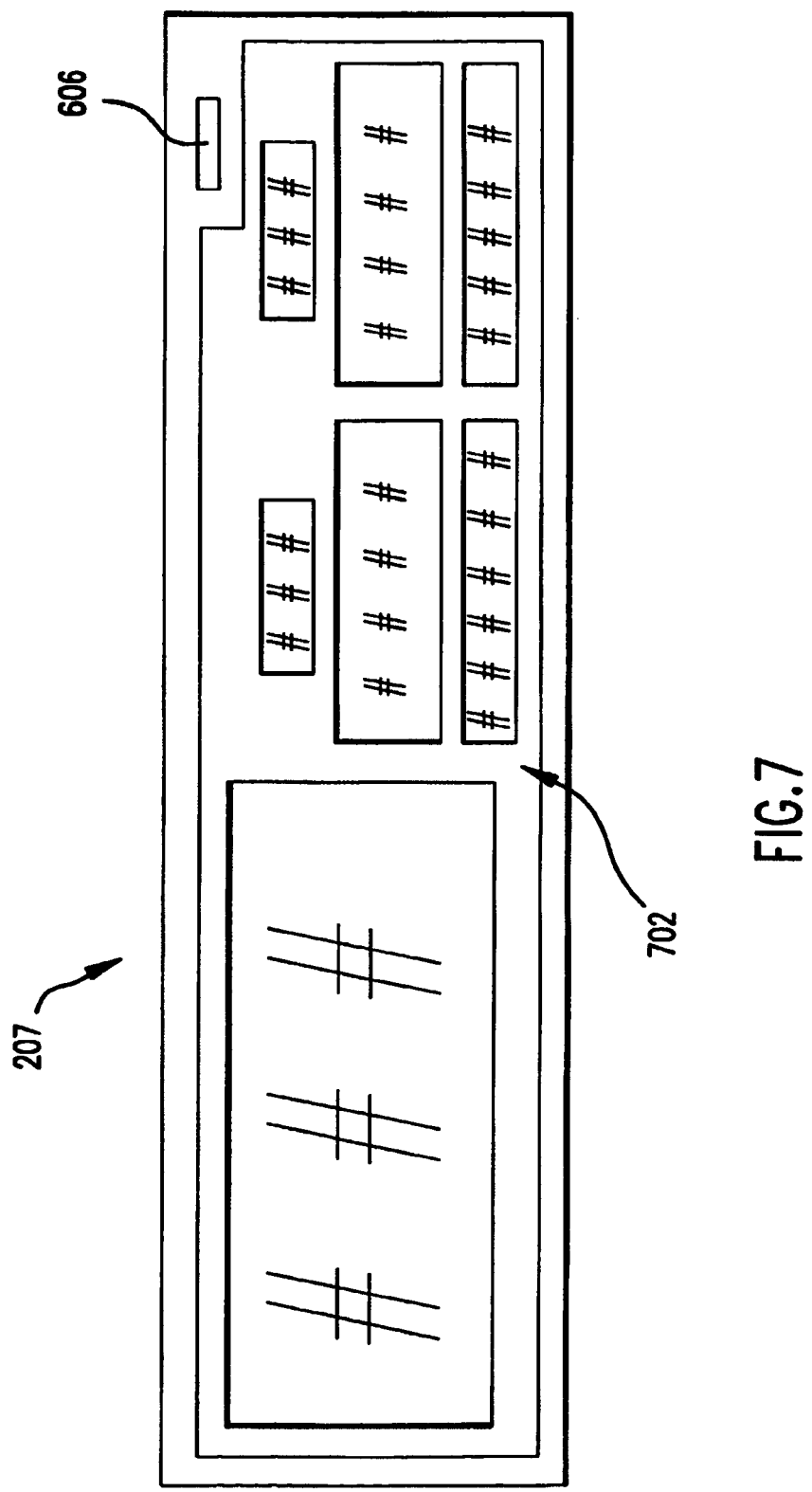
FIG. 7 illustrates an electronic pricing display unit, according to an embodiment of the invention.

FIG. 7 illustrates an electronic pricing display unit, according to an embodiment of the invention, wherein a second embodiment of an EPDU 207, which is larger than EPDU 206 shown in FIG. 6, has additional features described below. The second electronic display unit 702 of FIG. 7 encompasses nearly the entire display. There are means for mounting the assembly package, power supplies, etc., which are well known to those skilled in the art. The second electronic display 702 is a highly versatile and functional display which is capable of generating images, and many different types of font and font sizes. That which was displayed on cardboard or metal or plastic in the first embodiment of the EPDU 206A, shown in FIG. 6, can be replicated in electronic format. As in FIG. 6, the second electronic display 702 is the component that receives the instructions from ECR emulation hub 204 (of either embodiment), and displays the data that is transmitted to it, in the proper format. EPDU 206B is capable of displaying sales information, as shown. For example, different displays can be displayed and easily switched if a new type of merchandise or product were to be displayed in this location. Thereupon this information would have to be made known to the appropriate ECR emulation hub 204 so that it would know which products or merchandise correlates to the specific EPDU 206B attached to the particular display. EPDU 206B also has the product information request mechanism 606, for requesting product information, the operation of which has already been described.

Figure 8:
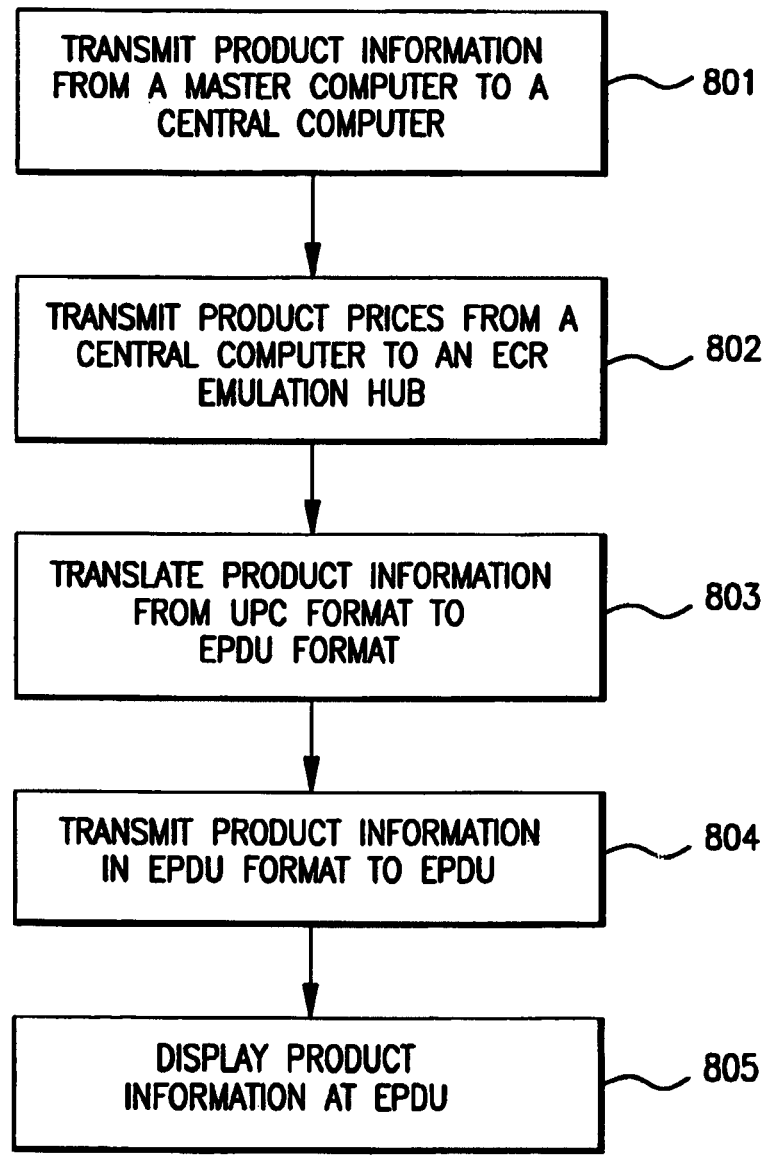
FIG. 8 is a flow diagram that illustrates a method for the electronic distribution and display of product information at a retail establishment, according to an embodiment of the invention.

FIG. 8 is a flow diagram that illustrates a method for the electronic distribution and display of product information at a retail establishment, according to an embodiment of the invention. The method for the electronic distribution and display of product information at a retail establishment begins in step 801, wherein product information is transmitted from master computer 106 to a central computer 202. This transmission occurs through either satellite means, wide area network means, a local area network means, a directly hardwired interface, RF, or any other wireless or wired means for communicating information from one location to another. Product information is stored in auxiliary PLU 114. The transmitted product information from the master computer 106 is received at the central computer 202 and in step 802 is transmitted from that central computer 202 to an ECR emulation hub 204. As previously described, this communication occurs mainly through a first communications bus 122, but can also be wireless, e.g., via RF, infrared or acoustical means.

When ECR emulation hub 204 receives the product information, at step 803, the product information is translated from the UPC format (that which is common to all electronic cash registers of the retail establishment), to a format appropriate to the EPDU. ECR emulation hub 204 preferably first verifies which EDPU 206 the product information is to be sent to, and determines any formatting requirements. This ensures that ECR emulation hub 204 acts as an "electronic cash register" 118 and thus functions like another component of the existing pricing system in the retail establishment 101. Therefore, all specialized hardware or software is contained within the ECR emulation hub 204 and does not in any way affect any existing hardware or software located within retail establishment 101.

In step 804, the product information is transmitted from ECR emulation hub 204 to EPDU 206 in the appropriate format. As previously discussed, there might be many different types of EPDUs 206 located within one retail establishment 101. However, such formatting problems are immaterial and unnoticed by the retail establishment 101, and do not affect any existing hardware or software contained within any of the electronic pricing systems already in place. Lastly, in step 805, the product price or sales information is displayed at the EPDU for the customer to view when coming upon the display. Depending upon the type of EPDU 206 that is being utilized, product information could be price information alone (EPDU 206A) or product price and/or sales information (EPDU 206B). The display produced by an EPDU can include a variety of sensory outputs including audio, visual, textual (i.e. a changeable braille display) or even olfactory outputs.

Figure 9:
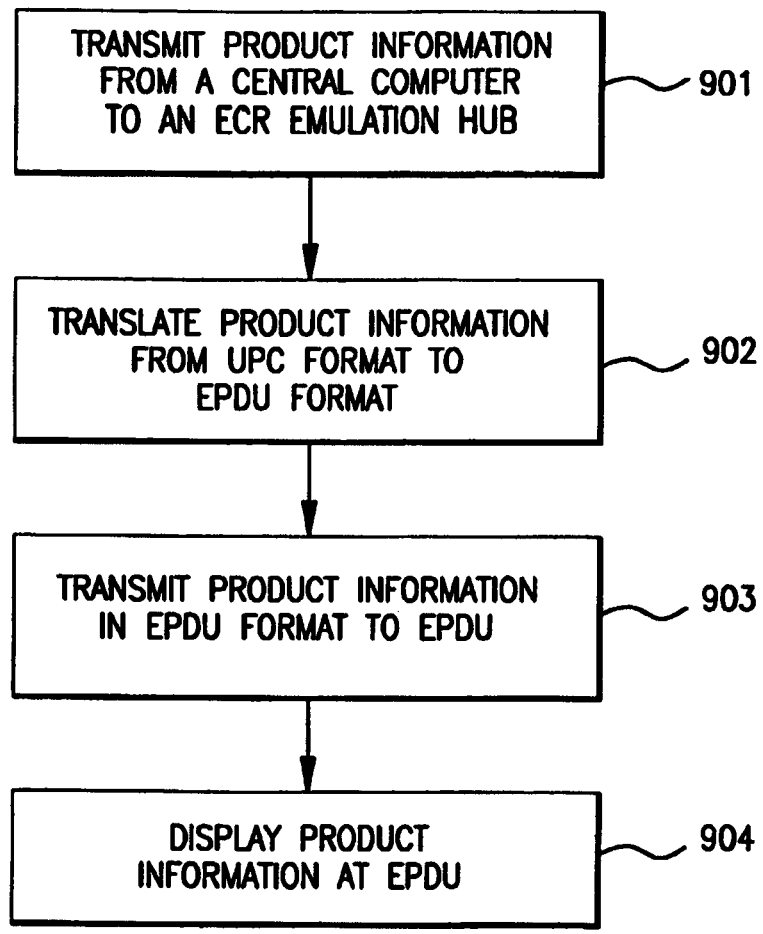
FIG. 9 is a flow diagram that illustrates a method for the electronic distribution and display of product information at a retail establishment, according to an embodiment of the invention.

FIG. 9 is a flow diagram that illustrates a method for the electronic distribution and display of product information at a retail establishment, according to an embodiment of the invention. The method of FIG. 9 for the electronic distribution and display of product information at a retail establishment begins with step 901 wherein product information is transmitted from a central computer 202 to ECR emulation hub 204. After transmission from the central computer to ECR emulation hub 204, the received product information is translated from the UPC format to the appropriate EPDU 206 format. ECR emulation hub 204 preferably first verifies which EDPU 206 the product information is to be sent to, and determines any formatting requirements. Again, EPDU 206 formats can be different from electronic display to electronic display, depending on what EPDUs 206 are available for the various product displays 210. For example, a certain EPDU could be much larger than another EPDU for different areas of a store, in which the format must necessarily be different. It is to be noted, though, that such changes in format translation are completely unnoticed and do not affect any existing electronic pricing display systems contained in any retail store establishment 101. In step 903, the translated product information is transmitted in the proper EPDU 206 format to the appropriate EPDU 206. Lastly, in step 904, the product information is displayed by the EPDU 206 at the appropriate display. Depending upon the type of EPDU 206 that is being utilized, product information could be price information alone (EPDU 206A) or product price and/or sales information (EPDU 206B). The sales price displayed at the EPDU can be recorded at the ECR emulation hub in memory that is either fixed or removable, or transmitted back to an auditing authority over a network or the internet. This feature allows for automatic auditing of promotional pricing offers such as those made by the product manufacturer.

Figure 10:
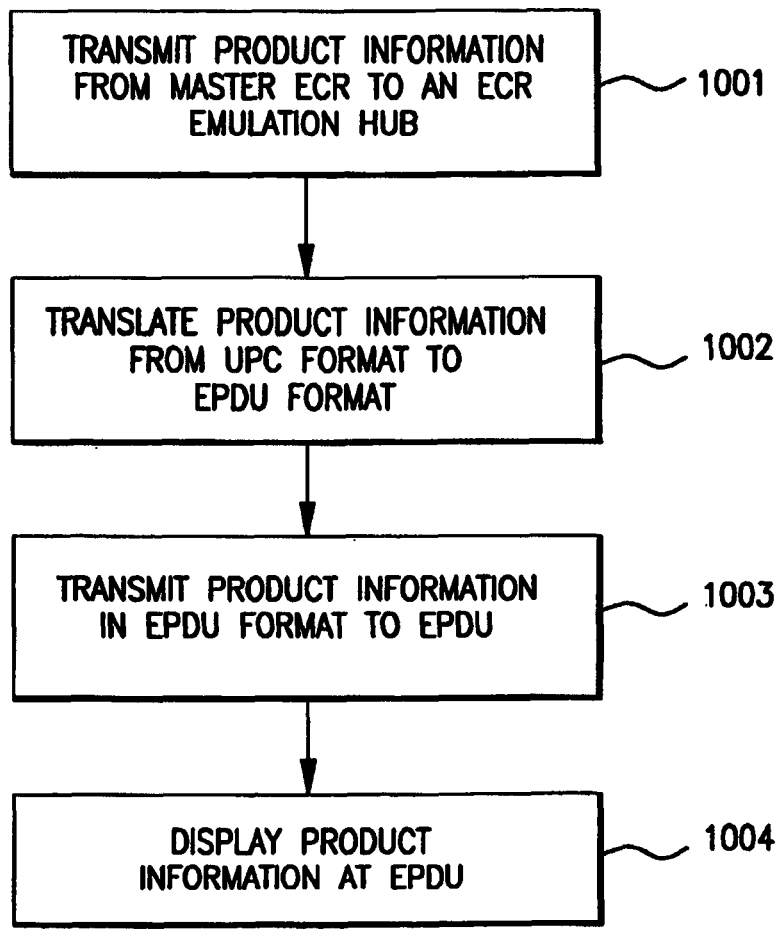
FIG. 10 is a flow diagram that illustrates a method for the electronic distribution and display of product information at a retail establishment, according to an embodiment of the invention.

FIG. 10 is a flow diagram that illustrates a method for the electronic distribution and display of product information at a retail establishment, according to a third embodiment of the invention. The method of FIG. 10 for the electronic distribution and display of product information at a retail establishment begins with step 1001 in which product information is transmitted from a master ECR 302 to ECR emulation hub 204. In step 1002, ECR emulation hub 204 receives the transmitted product information and translates it from the UPC format to a format in which the attached EPDUs 206 can receive and display the product information. Alternatively, a simple master/slave ECR system can use a simple price key to a price table rather than using UPC's for price lookup.

In step 1003, the translated product information is transmitted from ECR emulation hub 204 to the appropriate EPDU 206 in the appropriate EPDU format. And, lastly, in step 1004, EPDU 206 receives the properly formatted product information and displays the same for viewing by the customer at the appropriate display. Depending upon the type of EPDU 206 that is being utilized, product information could be price information alone (EPDU 206A) or product price and/or sales information (EPDU 206B).

Figure 11:
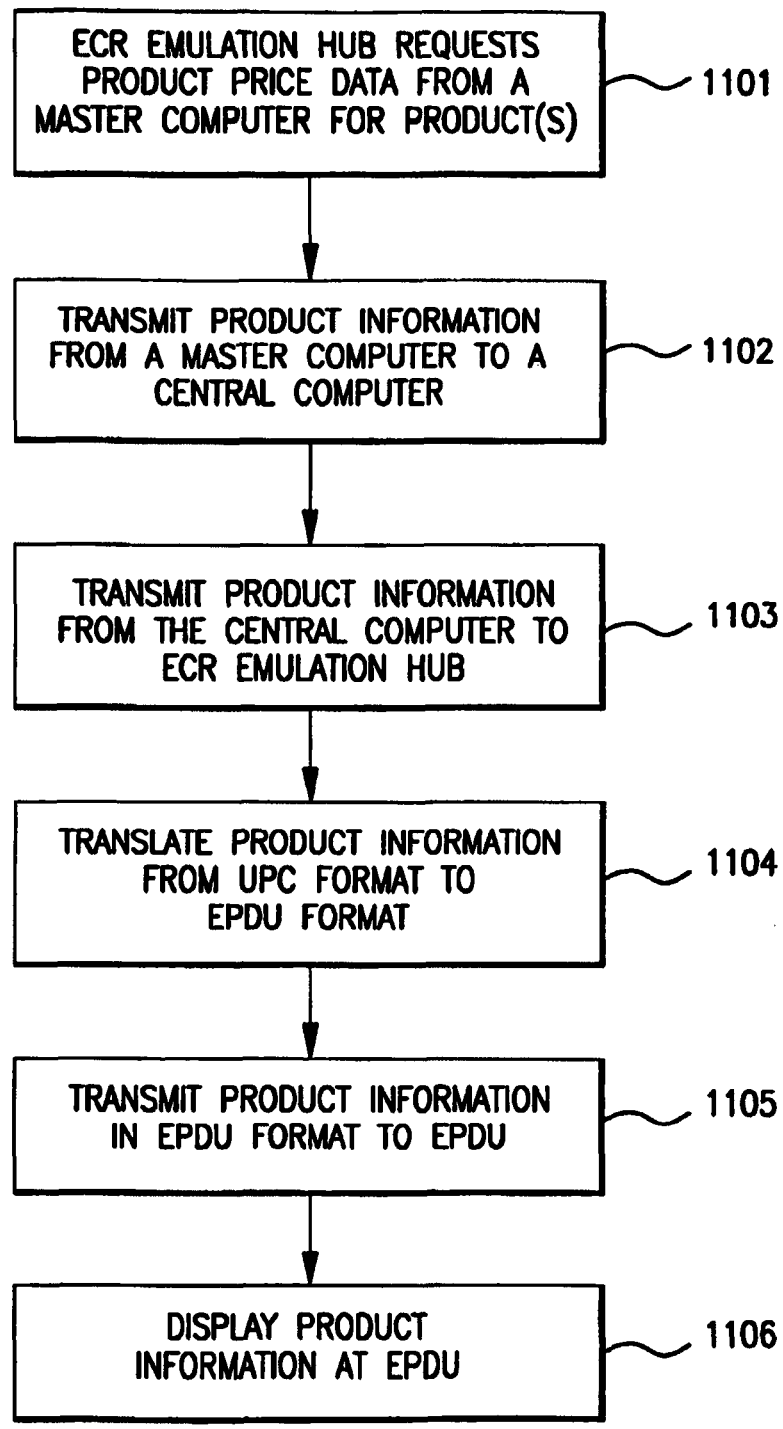
FIG. 11 is a flow diagram that illustrates a method for the electronic distribution and display of product information at a retail establishment, according to an embodiment of the invention.

FIG. 11 is a flow diagram that illustrates a method for the electronic distribution and display of product information at a retail establishment, according to an embodiment of the invention. The method of FIG. 11 for the electronic distribution and display of product information at a retail establishment begins with step 1101. In step 1101 an ECR emulation hub 204 requests product information from a master computer 106 for a specific product, or products. The requested product information is transmitted from master computer 106 to central computer 202 in step 1102. Alternatively, the centrally managed PLU system can use a local in-store copy of the PLU, which is only infrequently updated by the master computer at the headquarters. The retail manager can instruct the in-store system to update the table, typically at night when people will not be impacted by the price changes.

In step 1103, the central computer 202 transmits the requested product information to an ECR emulation hub 204. In step 1104 ECR emulation hub 204 translates the product information from a UPC format to the appropriate EPDU 206 format. In step 1105, ECR emulation hub 204 transmits the translated product information to the appropriate EPDU 206 in the appropriate EPDU format. Lastly, in step 1106, the EPDU 206, having received an appropriately formatted data message, which contains product information, displays the product information for viewing by customers at the appropriate EPDU 206. Depending upon the type of EPDU 206 that is being utilized, product information could be price information alone (EPDU 206) or product price and/or sales information (EPDU 207).

Figure 12:
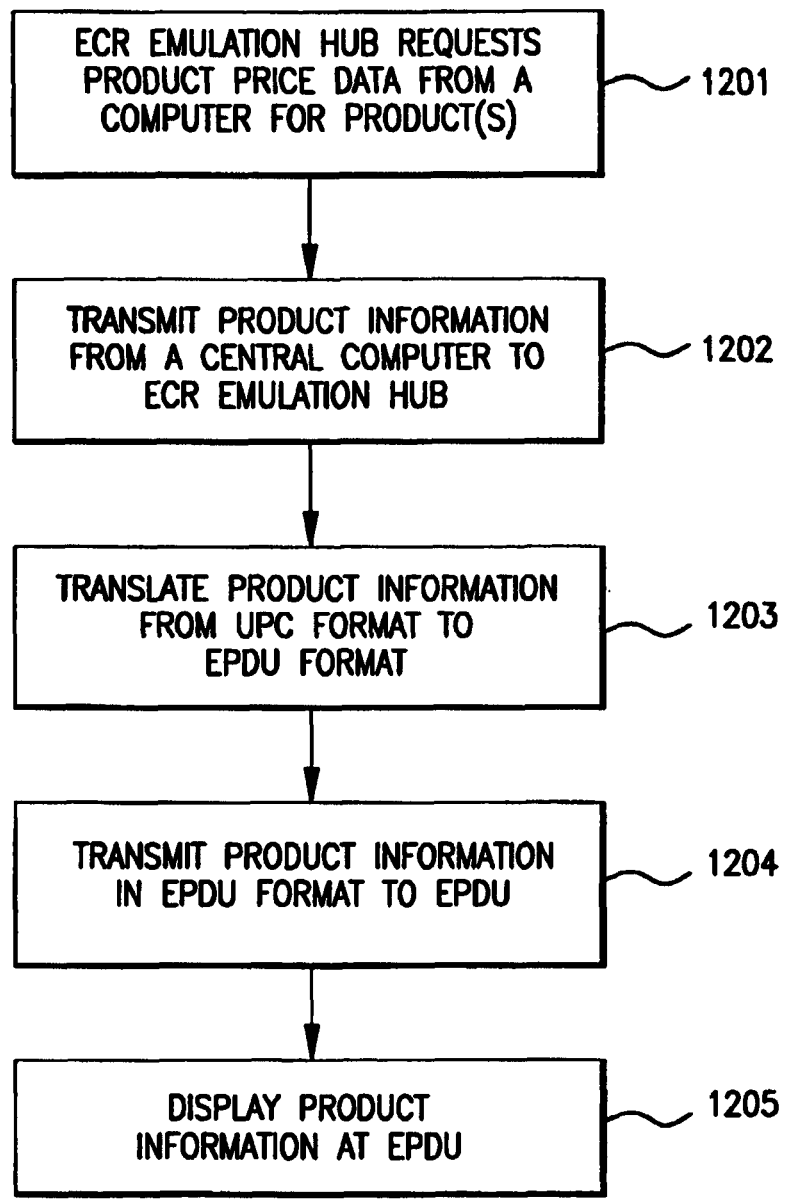
FIG. 12 is a flow diagram that illustrates a method for the electronic distribution and display of product information at a retail establishment, according to an embodiment of the invention.

FIG. 12 is a flow diagram that illustrates a method for the electronic distribution and display of product information at a retail establishment, according to an embodiment of the invention. The method of FIG. 12 for the electronic distribution and display of product information at a retail establishment begins with step 1201. In step 1201 an ECR emulation hub 204 requests product information from a central computer 202 for a specific product, or products. The requested product information is transmitted from central computer 202 ECR emulation hub 204 in step 1202. In step 1203 ECR emulation hub 204 translates the product information from a UPC format to the appropriate EPDU 206 format. In step 1204 ECR emulation hub 204 transmits the translated product information to the appropriate EPDU 206 in the appropriate EPDU format. Lastly, in step 1205, the EPDU 206, having received an appropriately formatted data message, which contains product information, displays the product information for viewing by customers at the appropriate EPDU 206. Depending upon the type of EPDU 206 that is being utilized, product information could be price information alone (EPDU 206) or product price and/or sales information (EPDU 207).

Figure 13:
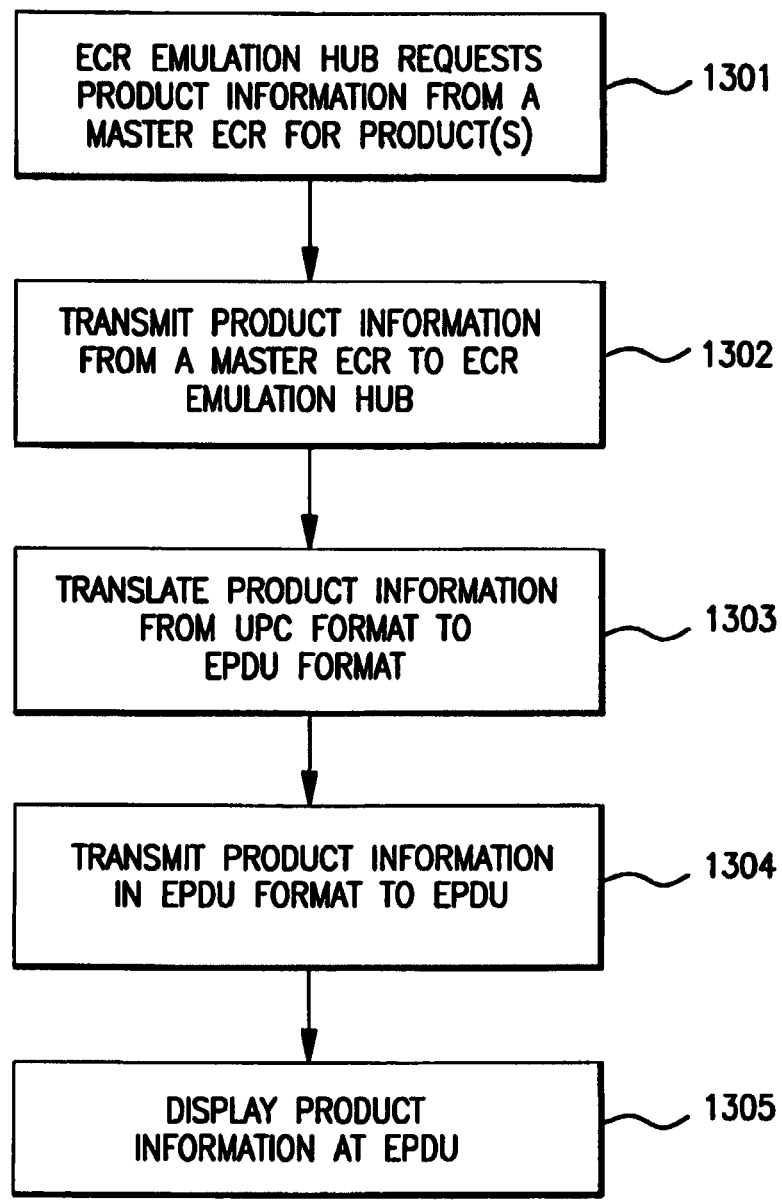
FIG. 13 is a flow diagram that illustrates a method for the electronic distribution and display of product information at a retail establishment, according to an embodiment of the invention.

FIG. 13 is a flow diagram that illustrates a method for the electronic distribution and display of product information at a retail establishment, according to an embodiment of the invention. The method of FIG. 13 for the electronic distribution and display of product information at a retail establishment begins with step 1301. In step 1301 an ECR emulation hub 204 requests product information from a master ECR 302 for a specific product, or products. The requested product information is transmitted from master ECR 302 to ECR emulation hub 204 in step 1302. In step 1303 ECR emulation hub 204 translates the product information from a UPC format to the appropriate EPDU 206 format. In step 1304, ECR emulation hub 204 transmits the translated product information to the appropriate EPDU 206 in the appropriate EPDU format. Lastly, in step 1305, EPDU 206, having received an appropriately formatted data message, which contains product information, displays the product information for viewing by customers at the appropriate EPDU 206. Depending upon the type of EPDU 206 that is being utilized, product information could be price information alone (EPDU 206) or price and/or sales information (EPDU 207).

The embodiments described above are merely given as examples and it should be understood that the invention is not limited thereto. It is of course possible to embody the invention in specific forms other than those described without departing from the spirit of the invention. Further modifications and improvements which retain the basic underlying principles disclosed and claimed herein, are within the spirit and scope of this invention.

The invention claimed is:

1. A system for the distribution and display of product information in a retail establishment, comprising:
    different types of electronic price display units (EPDUs) connected to a communication bus of the retail establishment, wherein each EPDU displays product information associated with supported merchandise and two or more of the EPDUs have different display formats;
    a master electronic cash register (Master ECR) having a communications interface for communicating the product information requested by an electronic cash register (ECR) over the communication bus; and
    an electronic cash register emulation hub (ECR Emulation Hub) connected for bidirectional communication with one or more ECRs and the Master ECR over the communication bus, the ECR Emulation Hub being configured to receive the product information requested by the ECR from the Master ECR, the product information being related to products supported by the one or more EPDUs connected to the ECR Emulation Hub, translate the product information to a display format specified by each of the one or more EPDUs, and send the product information received from the Master ECR to a respective EPDU of the one or more EPDUs connected to the ECR Emulation Hub, and store, in removable memory, the product information displayed at the respective EPDUs.

2. The system according to claim 1, wherein the product information includes data related to images displayed at the respective EPDU.

3. The system according to claim 1, wherein the ECR Emulation Hub is configured to monitor communication between the one or more ECRs and the Master ECR involving product information associated with the supported merchandise.

4. The system according to claim 1, wherein the respective EPDU displays the production information received over the communication bus from the ECR Emulation Hub.

5. The system according to claim 1, wherein the product information includes product price information.

6. The system according to claim 1, wherein the product information includes product sales information.

7. The system according to claim 1, wherein a sales price displayed at the respective EPDU is recorded in the removable memory of the respective EPDU.

8. The system according to claim 2, wherein the respective EPDU generates the displayed images in association with the data received from the ECR Emulation Hub, the data being included in the product information stored in removable memory at the ECR Emulation Hub.

9. The system according to claim 8, wherein the data includes product price information.

10. The system according to claim 8, wherein the data includes product sales information.

11. The system according to claim 8, wherein the data includes at least one of product price and sales information.

12. A method for distributing and displaying product information in a retail establishment including different types of electronic price display units (EPDUs) configured to display product information wherein two or more EPDUs use different display formats for displaying the product information, a master electronic cash register (Master ECR), and an electronic cash register emulation hub (ECR Emulation Hub) connected to a communication bus, the method comprising:

receiving product information from the Master ECR, the product information being requested by an ECR connected to the communication bus and related to products supported by the ECR Emulation Hub;

formatting the product information received from the Master ECR for display at one or more of the EPDUs based on a display format specified by each of the one or more EPDUs, respectively; and storing, in removable memory, the product information displayed at the one or more EPDUs, the product information including data associated with images displayed at the one or more EPDUs.

13. The method of claim 12, comprising:

monitoring communication between the one or more ECRs and the Master ECR for product information associated with supported merchandise.

14. A device for emulating an electronic cash register in a retail price distribution system, which includes different types of electronic price display units (EPDUs) and a master electronic cash register (Master ECR), wherein two or more EPDUs use different display formats for displaying product information, the device comprising:

an interface for communicating with one or more EPDUs and the Master ECR over a communication bus;

at least one processor configured for monitoring the communication bus for data related to supported merchandise requested by one or more ECRs and communicated between the one or more ECRs and the Master ECR, and formatting product information received from the Master ECR based on the request for display on at least one EPDU, the formatting being based on a display specification of the at least one EPDU; and removable memory for storing the product information communicated with the one or more EPDUs over the communication bus, the product information including data associated with images displayed at the one or more EPDUs.

* * * * *